Patented Dec. 23, 1952

2,623,030

UNITED STATES PATENT OFFICE 2,623,030

PREPARATION OF IMPROVED POLYMERIZABLE UNSATURATED ALKYD COMPOSITIONS

David E. Cordier, Toledo, Ohio, assignor to Libbey-Owens-Ford Glass Company, Toledo, Ohio, a corporation of Ohio No Drawing. Application June 4, 1951,
Serial No. 229,873

4 Claims. (Cl. 260—40)

The invention relates to polymerizable unsaturated alkyd compositions having improved physical and chemical properties, and polymerized materials therefrom having improved water-resistance and electrical properties.

A polymerizable unsaturated alkyd (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other heat-hardenable compositions to reach a fused state below their hardening temperature is a great handicap in fabricating operations. By the time a urea-formaldehyde or phenol-formaldehyde composition has reached a fused state in a fabricating operation, its hardening already has begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable alkyd is resinous because it is a polymer. The resinous state of such an alkyd makes it possible to employ the alkyd in a molding operation either alone or in admixture with a filler. A non-resinous liquid composition, such as a diallyl ester, cannot be used in a molding operation because it would be squeezed out of the filler and squirted out of the mold.

A saturated heat-hardenable alkyd, such as glycerol phthalate, is hardened by esterification with elimination of water. An alkyd that is hardened by esterification cannot be employed to make a molded article or other solid body because it is too difficult to remove water from the interior of such a solid body in order to complete the hardening. Even urea-formaldehyde and phenol-formaldehyde compositions tend to give off small amounts of volatiles as they are hardened in a mold. In contrast a polymerizable unsaturated alkyd hardens by polymerization without the evolution of volatiles.

For the foregoing reasons, a polymerizable unsaturated alkyd is particularly well adapted for many industrial uses. However, a polymerizable unsaturated alkyd has certain physical and chemical properties which leave something to be desired. For example, the resinous nature of a polymerizable unsaturated alkyd ordinarily causes the composition in which it is used to be a sticky, putty-like composition which is difficult to handle. Also, such an alkyd is chemically active in that it causes mold staining and corrosion of a steel mold to such an extent that hot molded articles have a tendency to stick to the mold. Moreover, hardened or polymerized articles made from a molding composition containing such an alkyd tend to have inferior water-resistance so that their electrical properties deteriorate upon exposure to moisture.

The principal object of the invention is to provide a novel polymerizable unsaturated alkyd composition which, after polymerization, is greatly improved in the retention of its insulation resistance and other desirable properties on long exposure to high temperatures and high humidities.

More specific objects and advantages are apparent from the description, which merely discloses and illustrates and is not intended to limit the scope of the invention.

It is well known that an inorganic peroxide is substantially inoperative as a catalyst for the polymerization of an unsaturated alkyd (i. e., an unsaturated polycarboxylic acid-polyhydric alcohol polyester). The present invention is based upon the discovery that although a peroxide of zinc or cadmium has substantially no effect as a polymerization catalyst for an unsaturated alkyd, such a peroxide has a peculiar and important benefit when used in such an alkyd in that it greatly improves the ability of the alkyd, after polymerization, to retain its insulation resistance on long exposure to high temperatures and high humidities.

To permit satisfactory polymerization or hardening of a composition embodying the invention to be carried out, the composition contains an organic peroxide or ozonide. The organic peroxide or ozonide in a composition embodying the invention is a very effective polymerization catalyst, so that the inorganic peroxide in the composition is of no value as a polymerization catalyst. The action of the inorganic peroxide is not to accelerate the polymerization but, as explained hereinafter, to react with other ingredients in the composition when the composition is hardened at an elevated temperature. If an inorganic peroxide were used alone in the composition without an organic peroxide or ozonide, the final product would be unsatisfactory because of insufficient polymerization and the beneficial effect that is obtained by the use of an inorganic peroxide in the practice of the present invention would be completely obscured. Thus, an inorganic peroxide heretofore has been considered to be merely an unsatisfactory polymerization catalyst. It was not until an inorganic peroxide of a certain specific class was used in combination with an organic peroxide or ozonide in the practice of the present invention that the valuable effect which such an inorganic peroxide has in such combination was discovered.

A hardenable composition embodying the invention comprises (1) a peroxide of an amphoteric metal of group II having an atomic weight between 65 and 115 (2) a polymerizable unsaturated alkyd whole molecule contains a plurality of polymerizable reactive $\Delta^{2,3}$-enedioyl groups, and (3) a catalyst of the class consisting of organic peroxides and organic ozonides, said composition, after polymerization, being superior in its ability to retain its insulation resistance on long exposure to high temperatures and high humidities.

The magnitude of the improvement in a single property such as the retention of insulation resistance, that is obtained in the practice of the invention has been demonstrated by tests carried out as follows:

A polymerizable unsaturated alkyd was prepared by the procedure hereinafter described from a charge consisting of 1.05 mols of monoethylene glycol, 0.8 mol of maleic anhydride, 0.2 mol of phthalic anhydride and an amount of hydroquinone equal to 0.04 per cent of the charge. The charge was heated to 230° C. (over a period of two hours) and was held at 230–235° C. for five hours more. The resulting alkyd (70 parts), which had an acid number of about 35, was cooled to 60–80° C. and was mixed thoroughly with diallyl phthalate (25 parts) and a paste of tricresyl phosphate (2 parts) and benzoyl peroxide (2 parts), as a catalyst. The composition so prepared (33 parts) was then milled with 20 parts of anthophyllite fibers, 47 parts of kaolin and, as a lubricant, two parts of zinc stearate for 10–12 minutes in a heated two-roll (differential speed) rubber mill at the lowest temperature at which a homogeneous mass could be obtained (not above about 75° C.). The resulting composition was removed in sheets and reduced to a sheet thickness of about ¼ inch by rolling with cold rolls while the composition cooled. Test pieces (discs two inches in diameter, having a thickness of ⅛ inch and an approximate weight of 7 grams) were molded from the sheeted material under a pressure of 17,000 pounds per square inch of projected area in a mold heated with 75 pounds per square inch of steam.

Several compositions comprising a peroxide of the invention, viz., zinc peroxide, were prepared by a procedure that was the same as the procedure described above except that in each composition an equal weight of the kaolin filler was replaced with 1.1, 2.7, 5.3 or 10.7 parts of zinc peroxide plus 0.9, 2.3, 4.7 or 9.0 parts respectively of a filler comprising a mixture of $Zn(OH)_2$, ZnO, and $ZnCO_3$. The molding compositions so obtained were used to mold test pieces for determining the retention of insulation resistance of articles molded from the polymerizable alkyd compositions. The test pieces were cut into half portions to form retention of insulation resistance test specimens. These specimens were tested by a standard retention of insulation resistance test for molded plastics. The conditions maintained for the test were 95 per cent relative humidity and a temperature of about 160° F. The results of the insulation resistance tests are recorded in Table 1 below.

TABLE 1

RETENTION OF INSULATION RESISTANCE AT 95% R. H. AND 160° F.

| Percent Peroxide in the Composition | Percent Filler Comprising $Zn(OH)_2$, ZnO and $ZnCO_3$ | Resistance in Megohms | | |
|---|---|---|---|---|
| | | Initial | 4 days | 7 days |
| | Percent | | | |
| No $ZnO_2$ (control) | None | over $10^6$ | $0.560\times10^3$ | $0.3\times10^3$ |
| 1.1% $ZnO_2$ | 0.9 | over $10^6$ | $10\times10^3$ | $3.5\times10^3$ |
| 2.7% $ZnO_2$ | 2.3 | over $10^6$ | $37\times10^3$ | $18\times10^3$ |
| 5.3% $ZnO_2$ | 4.7 | over $10^6$ | $32\times10^3$ | $16\times10^3$ |
| 10.7% $ZnO_2$ | 9.3 | over $10^6$ | $7\times10^3$ | $3.5\times10^3$ |

The superiority of compositions comprising a peroxide of the invention is apparent from the results recorded in Table 1. An article molded from the optimum composition of the invention possessed 66 times as much insulation resistance as an article molded from the control composition when the articles had been exposed to the test conditions for four days. Moreover, an article molded from the optimum composition possessed 54 times as much insulation resistance as an article molded from the control composition when the articles had been exposed to the test conditions for seven days.

Plastic articles which possess excellent retention of insulation resistance are especially valuable where electrical insulation must be maintained, and where the plastic articles are exposed to warm, humid atmospheres. Alkyd molding compositions comprising the peroxides of the invention are therefore commercially desirable for the manufacture of numerous electrical devices such as automobile ignition coil housings, electric switch parts, capacitors, connectors, etc.

*Inorganic peroxide*

The peroxides that may be used in the practice of the invention are zinc peroxide, cadmium peroxide and hydrates thereof. These peroxides may be prepared by any known method, for example, by reacting the hydroxide of the metal with hydrogen peroxide. For the sake of brevity, hereinafter a peroxide of an amphoteric metal of group II having an atomic weight between 65 and 115 will be called a "peroxide."

Zinc peroxide, the preferred peroxide for use in the instant invention, is available as "commercial zinc peroxide." One such product comprises 53.5 per cent zinc peroxide, 35.8 per cent zinc hydroxide, 8.8 per cent zinc oxide, and 1.8 per cent zinc carbonate. Another commercially available product that can be used consists of about 55 per cent zinc peroxide; the remainder of the product comprises a mixture of zinc oxide and zinc hydroxide.

The peroxide of an amphoteric metal of group II reacts basically with respect to the polymerizable alkyd that is present in the practice of the invention. In other words, the peroxide releases its cation to replace the hydrogen of the carboxy radicals in the polymerizable alkyd.

Although it is not desired to limit the invention to any particular theory, it is believed that the fundamental theoretical considerations of the instant invention are as follows: There are two types of linkages in the molecules of a product obtained by the polymerization of an unsaturated alkyd, namely, those formed through esterification of the carboxy radicals with the alcoholic hydroxy radicals, and those formed through (addition) polymerization at the olefinic double bonds. The inferior water-resistance of a solid, infusible polymerized alkyd is believed to be due, at least in part, to the presence of an appreciable number of unesterified carboxy and hydroxy radicals in the molecules of such a resin. The presence of such radicals is understood to be due to incomplete esterification. The present invention is based upon the discovery that, when used as agents for "fixing" such radicals, the peroxides of certain metals of group II produce outstanding improvements in the properties of the alkyds and also provide numerous advantages in the industrial use of the alkyds.

*Polymerizable unsaturated alkyd*

A composition of the invention comprises a polymerizable unsaturated alkyd whose molecule contains a plurality of polymerizably reactive $\Delta^{2,3}$-enedioyl groups. Such an unsaturated alkyd is a polyester prepared by reaction of one or more polyhydric alcohols with one or more polycarboxylic acids having in the molecule at least one polymerizably reactive $\Delta^{2,3}$-enoyl group, having the structure

Thus, the polymerizable alkyd is one having polymerizably reactive $\Delta^{2,3}$-enoyl groups contained in dioyl radicals (connecting polyhydric alcohol residues through ester linkages), which dioyl radicals may therefore be defined as $\Delta^{2,3}$-enedioyl radicals (e. g., butenedioyl radicals such as maleyl or fumaryl radicals). The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). For the purpose of the instant invention it is to be understood that the term "unsaturated alkyd" means an alkyd that is polymerizable into an infusible or high melting point resin; so the proportion of unsaturated components should be such that the alkyd contains an average of at least three double bonds per molecule.

The present invention is applicable to all polymerizable unsaturated alkyds. Preferably the alkyd is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render the $\Delta^{2,3}$-enoyl groups polymerizably nonreactive. The alkyd may be an ester of a polycarboxylic acid with any glycol, such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Also, the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, napththalene dicarboxylic or cyclohexane dicarboxylic acid, or diglycolic, dilactic or resorcinol diacetic acid.

In the practice of the invention the preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the alkyd molecules. In fact, a linear (or substantially linear) alkyd may be obtained even though in the preparation of such alkyd a small proportion of the dihydric alcohol (e. g., less than about 5 mol per cent of the alcohol) is replaced by a polyhydric alcohol containing more than two alcohol radicals, such as glycerol or pentaerythritol, or a small proportion of the dibasic acid (e. g., less than about 5 mol per cent of the acid) is replaced by a polybasic acid containing more than two acid radicals, such as citric acid. The preferred linear alkyd for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the alkyd during the esterification reaction.

The molecular weight of polymerizable unsaturated alkyds for use in the practice of the invention may vary over a wide range, depending upon the initial reaction ingredients and upon the degree of reaction obtained in the preparation of the alkyds. An alkyd used in the practice of the invention may have a molecular weight ranging from as low as about 500 to as high as about 5000, but ordinarily the molecular weights of preferred polymerizable unsaturated alkyds used in the present invention are in the lower portion of the range; for example, the molecular weight of an alkyd prepared from ethylene glycol, maleic anhydride and small amounts of propylene glycol and phthalic anhydride usually is within the range from about 700 to about 2000.

The number of repeating units in a polymerizable unsaturated alkyd chain, i. e., the number of acid and alcohol residues in the chain-like molecules of the alkyd may also vary, and alkyds having a high molecular weight have correspondingly long chain molecules. In general, in a polymerizable alkyd used in the practice of the invention the number of repeating units in the alkyd chains may range from about 3 to about 25. However, in preferred alkyds used in the present invention there are usually from about 4 to about 15 units in the alkyd chains. Assuming that there is substantially no cross-linking in such polymerizable unsaturated alkyds and that equivalent quantities of, for example, glycol and maleic acid are employed, the number of olefinic unsaturations attached to carbon atoms in the chains of such polymerizable alkyds is, of course, merely the number of acid residues in the alkyd chain. However, if part of the maleic acid is replaced by a saturated acid in the preperation of a polymerizable alkyd, the number of olefinic unsaturations is lower in proportion to the amount of saturated acid employed, even though the number of acid and alcohol units in the chain remains about the same. Other properties of the unsaturated alkyd, such as solubility in various solvents, also may be varied by selecting various reacting ingredients and varying their proportions. The infusibility, hardness and inertness of the product obtained by polymerization of the alkyd may be increased by varying the initial reacting ingredients to increase the average number of olefinic double bonds per molecule of the polymerizable alkyd.

In the preparation of the polymerizable unsaturated alkyd, any of the usual modifiers such as monobasic acids, monohydric alcohols and natural resin acids may be added. The larger the proportions of monobasic acids and monohydric alcohols, the lower is the average number of acid and alcohol residues in the resulting alkyd molecules, and the lower is the viscosity of the alkyd. On the other hand, the more nearly equal the molecular proportions of the dibasic acid and dihydric alcohol, the greater is the average number of residues in the resulting alkyd molecules, and the greater is the viscosity. The proportions of ingredients used are those proportions that produce a polymerizable alkyd of the desired viscosity. In the practice of the invention it is desirable that the proportion of monobasic acids and monohydric alcohols be kept low enough to allow substantial growth of the chain-like molecules during preparation of the unsaturated alkyd, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterfies those end groups present in the existing alkyd chains and, therefore, only a small amount may be incorporated in the alkyd without having any deleterious effect upon the fiinal product.

In the production of polymerizable unsaturated alkyd compositions in the practice of the invention, the proportion of monohydric alcohol or monobasic acid used is never above about 10 mol per cent of the acid or alcohol content. Ordinarily the proportion of monohydric alcohol or monobasic acid that may be incorporated in polymerizable unsaturated alkyds for use in molding compositions of the invention is not more than about 5 mol per cent of the alcohol or acid content, although alkyds used in casting compositions occasionally may contain a slightly higher proportion of monofunctional ingredients. However, polymerizable unsaturated alkyds for use in the practice of the invention usually contain not more than about 2 mol per cent of monofunctional acid or alcohol in order that such alkyds may be readily polymerized into infusible or high melting point resins.

The point to which the reaction of the ingredients is carried in the preparation of the polymerizable alkyd is simply that point at which the product has the desired consistency. The consistency or viscosity of the alkyd (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the alkyd, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable alkyd may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, an alkyd is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting alkyd is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable alkyd may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting alkyd is a very thick gum having an acid number of 53.

A polymerizable alkyd may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting alkyd is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting alkyd tends to be more viscous and greater care is necessary in order to prevent premature polymerization.

As a further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable alkyd may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable alkyd may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1

Polymerization of these materials usually is carried out at temperatures of about 70° to about 250° F. A solution comprising one or more polymerizable unsaturated alkyds and one or more polymerizable substances having at least one (preferably more than one) $CH_2=C=$ group per molecule and having a boiling point not less than 80° C. is particularly useful as a binder in the production of compositions of the invention. It is preferred that such substance be a monomer and that it be copolymerizable with the unsaturated alkyd used. The preferred $CH_2=CH=$ group is allyl. Monomeric substances that are useful for the preparation of such a solution include styrene, o-methyl styrene, methyl methacrylate, methyl acrylate, diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

A solution comprising one or more polymerizable unsaturated alkyds and one or more of such polymerizable monomeric compounds is particularly advantageous, because the alkyd has desirable physical properties and hardens very rapidly whereas the presence of the monomeric compound causes the polymerized product to be much more water resistant and insoluble. Moreover, the combination (solution) of the alkyd and the monomeric compound usually polymerizes much more rapidly than either of such substances alone. Such a solution usually contains from about 5 per cent to about 35 per cent of the polymerizable monomeric compound and from about 95 per cent to about 65 per cent of the polymerizable alkyd.

A polymerizable unsaturated alkyd molding composition embodying the invention ordinarily comprises a peroxide of zinc or cadmium, a polymerizable unsaturated alkyd (or solution thereof) of the type hereinbefore described and a catalyst for the polymerization of such alkyd, with any of the usual fillers, lubricants, plasticizers and coloring matter. In the molding composition the filler furnishes an improvement in the physical properties of the polymerized alkyd, which, in turn, acts as a binder for the filler. The filler may be a cellulosic material such as alpha cellulose; or the filler may be a mineral material in granular form such as clay, mica, silica and ground glass, or in fiber form such as glass fibers and asbestos.

Since the function of the alkyd in a molding composition is that of a binder, the proportion of a cellulosic filler in a molding composition embodying the invention may range from the minimum amount capable of appreciably improving the physical properties of the hardened product (i. e., about 1 per cent) to the maximum proportion which may be held together satisfactorily by the alkyd binder in the hardened product (i. e., about 80 per cent). Generally speaking, the preferred range for a cellulosic filler is from about 40 per cent to about 65 per cent of the molding composition, and the best all-around results are obtained at about 55 per cent to 60 per cent. The molding compositions containing very small amounts of a cellulosic filler are usually special compounds in which a mixed filler of a cellulosic material and a mineral material is employed. It may be desirable to use a mixed filler of a cellulosic material and a mineral material such as silica or asbestos in a cold molding composition, for example, in which the per cent of total filler in the composition may be as high as 90 per cent.

It may be desirable to use mineral material exclusively as a filler in a molding composition embodying the invention, particularly when very high water-resistance is required. The proportion of a mineral filler may range from the minimum amount required to improve appreciably the physical properties of the hardened product (i. e., about 5 per cent) to the maximum proportion which may be held together or bound satisfactorily by the alkyd (i. e., about 85 per cent). Generally speaking, the preferred range for mineral fillers is from about 60 per cent to about 70 per cent of filler in the molding composition, and the best all-around results are obtained in the upper portion of such range.

In the production of a molding composition embodying the invention the mixing of the filler with the polymerizable alkyd may be carried out by any of the known methods. If the alkyd is very viscous, it may be necessary to incorporate the filler in the alkyd in a heated two-roll (differential speed) rubber mill or it may be desirable to heat the alkyd in order to reduce the viscosity sufficiently to permit the use of other mixing procedures. Ordinarily the viscosity of the alkyd is such that kneading or equivalent mixing procedures may be used satisfactorily. In some cases it may be desirable to dilute the alkyd with a solvent in order to facilitate mixing with the filler.

Casting and adhesive compositions embodying the invention, of course, may contain as little as 1 per cent of a filler, and the maximum per cent of a filler in such compositions is simply that amount which may be added to the alkyd compositions without rendering the compositions too viscous to handle. For example, in adhesive compositions the proportion of a cellulose filler to the alkyd may range from as low as about 1:100 to as high as about 1:4, the preferred proportions being from about 1:30 to about 1:5. The proportion of a mineral filler to the alkyd may range from as low as about 1:100 to as high as about 1:1, the preferred proportions being from about 1:5 to about 1:2. In the production of casting and adhesive compositions embodying the invention the mixing of the filler with the polymerizable alkyd may be carried out by any of the known methods, for example, by heating the alkyd to reduce its viscosity, thus permitting the use of the ordinary mixing methods hereinbefore described for the preparation of a molding composition.

Although alkyd compositions embodying the invention which contain cellulosic fillers may be polymerized to form very useful articles of great strength, the alkyd compositions containing mineral fillers may be polymerized to obtain articles of great strength which also have outstanding water-resistance and electrical properties. In the practice of the invention the mineral fillers are preferred since they supplement to the greatest extent the improvements in water-resistance and electrical properties obtained in the practice of the invention. Among the mineral fillers, asbestos has been found to impart the greatest strength to the polymerized alkyd compositions of the invention, and, therefore, asbestos is preferred when strength is an essential factor. Also in the practice of the invention it has been found that a filler mixture of asbestos and kaolin or China clay may be used to obtain the best all-around results, in view of the facts that a substantial proportion of the asbestos may be replaced by kaolin without appreciably altering the strength, and that kaolin imparts greater water-resistance to the polymerized composition than does asbestos. Moreover, kaolin is less expensive than asbestos. A preferred form of kaolin for use in the invention is a commercial product known as "Georgia clay" (e. g., "Witco Ideal").

*Catalyst*

Since the polymerizable alkyd is fusible and plastic at relatively low temperatures, it is possible to adjust the amounts of catalyst and inhibiting agent so that the hardening at such temperatures takes place at a reasonable rate to allow ample opportunity for shaping and molding of the composition. In this manner molding compounds may be produced which are fast curing, gas free and adapted to complicated moldings (e. g., clock cases).

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide; or a mixture of such substances may be used as the curing catalyst.

The proportion of curing catalyst used in the practice of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with the different catalysts, and the amount of any particular curing catalyst required to produce a given rate of hardening may vary also with variations in the nature of the polymerizable composition. For example, an alkyd prepared from maleic anhydride and diethylene glycol, in a molding composition of the invention containing about 3 per cent of benzoyl peroxide, may be cured at approximately the same rate as a molding composition, containing a similar alkyd prepared from fumaric acid and diethylene glycol, in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the filler by grinding it with the filler in a ball mill, for example, before the filler is mixed with the alkyd. In some cases a filler may be mixed with a solution (in a volatile solvent) of the polymerization catalyst and dried before the filler is mixed with the alkyd. When the present method is carried out in the production of a molding composition or a casting composition, plasticizers, lubricants, pigments and other coloring matter may be incorporated if desired.

The peroxide of the invention may be considered a portion of the filler for the purpose of determining many of the physical properties of the alkyd composition, and one of the most amazing aspects of the present invention resides in the fact that the peroxide and cellulose, mineral fibers, non-fibrous minerals or mixtures thereof may be used as the ingredients of a filler combination which imparts substantially greater water resistance to the alkyd composition than any one of such ingredients used alone.

The full benefit of the use of the peroxide in the practice of the invention is obtained simply by incorporating the peroxide in the alkyd in the same manner as any filler, according to the procedures hereinbefore described. The peroxide may be incorporated in the alkyd alone or as a mixture with the fillers hereinbefore mentioned. In fact, although the peroxide has several chemical functions, it also functions physically as a part of the filler, and can be the only filler used in the practice of the invention. In determining the total amount of filler used the amount of peroxide is added to the amount of other filler used, so that the proportion of the total filler used in practice of the invention is within the range hereinbefore described, the preferred range being from about 60 per cent to about 70 per cent of the alkyd composition.

The proportion of a peroxide of the invention (e. g., zinc peroxide) which may be incorporated in an alkyd molding composition is from about 0.5 to about 25 per cent of the total molding composition. The preferred proportion of zinc peroxide is from about 2 to about 20 per cent of the total molding composition, and optimum results are obtained when the proportion is about 5 per cent of the total composition.

Although it is not desired to limit the invention to any particular theory, it is believed that the unusual and unexpected behavior of a peroxide of the invention can be explained by the fact that the peroxide acts as an additional independent ingredient in the alkyd. It has been ascertained by experiments that in the usual practice of the invention not all of the peroxide can be used up in the neutralization reaction with the carboxy radicals of the alkyd. First of all, there must always be a certain amount of the peroxide which is simply ensnared in the filler and the maze of molecular alkyd chains. Secondly, in the ordinary practice of the invention the amount of the peroxide used is more than that theoretically required to neutralize all the carboxy radicals. It is believed that the presence of the peroxide per se in the alkyd brings about one of the most important advantages of the instant invention, namely, the elimination of corrosion of steel molds by an alkyd molding composition. Corrosion of molds is believed to be caused by the acids (particularly phthalic and maleic acids) which are released from the alkyds during the molding operation, possibly by partial decomposition of the alkyds or possibly by volatilization of unreacted acid in the alkyds. Alkyd molding compositions embodying the invention are unique in that they do not corrode molds, presumably because the peroxide present prevents the escape of the acid by reacting therewith. Thus, it can be seen that the peroxide, as a reactant, is bifunctional in that some of it reacts first to neutralize the alkyd when initially incorporated therein, and some of it remains as an ingredient in the alkyd and reacts with the acid liberated during molding or during subsequent use under extreme conditions.

The presence of some of the peroxide as an ingredient in the alkyd does not, of course, alter the fact that an essential function of the peroxide is that of a reactant for neutralizing the carboxy radicals of the alkyd, but it may limit the maximum proportion of a particular peroxide which may be used in the practice of the invention. The unreacted particles of the peroxide present in the alkyd are so completely occluded in the alkyd composition that they may be assumed to act as inert filler material, and for many purposes it is believed that the peroxide present is substantially inert, but it has been found that by means of comparatively delicate tests, such as water-resistance tests, it is possible to demonstrate the differences in properties that different peroxides impart to the alkyd.

Group II metal oxides may be used as additional end-group fixing agents in molding compositions of the invention. Zinc oxides, one of the best group II metal oxides known for use in alkyd molding compositions, functions similarly to the peroxides of the invention when it is included in an alkyd molding composition. When zinc oxide is used in this way, any excess of the oxide that is not reacted to neutralize carboxy groups in the alkyd is occluded in the polymerized alkyd as an inert filler.

The reactions are similar for the peroxides and the metal oxides of group II used in alkyd molding compositions. However, zinc peroxide produces substantially better water resistance and better retention of insulation resistance in these plastics than the best group II metal oxide. Moreover, less zinc peroxide is needed to accomplish a greater improvement in the physical properties of articles molded from alkyd molding compositions.

The fact that the peroxides of the instant invention gives superior retention of insulation resistance to molded articles may be due to the release of oxygen when the peroxides react in the alkyd composition.

A peroxide used in the practice of the invention may be a hydrated peroxide. However, since it is one of the essential purposes of the invention to exclude water from the alkyd, it is not ordinarily desirable to deliberately incorporate water in the alkyd even in combined form as in a hydrated peroxide, and this is demonstrated by the fact that a substantial quantity of zinc peroxide may be used, whereas only a relatively small amount of (hydrated) zinc peroxide can be used in the practice of the invention without imparting undesirable properties to the alkyd. For this reason peroxides which are not hydrated are clearly preferred for use in the invention, and hydrated peroxides are used only in unusual situations and then ordinarily in very small amounts.

Zinc peroxide is the preferred peroxide of the invention for incorporation in alkyd molding compositions to produce especially desirable electrical properties in molded articles. However, cadmium peroxide imparts similar physical properties to a polymerized alkyd when it is included in such a composition in an amount equivalent to the zinc peroxide content that may be used. While both zinc peroxide and cadmium peroxide possess substantially equivalent chemical properties that enable them to be used as end-group fixing agents, zinc peroxide imparts somewhat better color properties to alkyd molding compositions and cadmium peroxide possesses somewhat better heat stability.

When an excessive proportion of peroxide is added to an alkyd, undesirable properties imparted by the peroxide to the alkyd counterbalance the advantages obtained in water resistance and electrical characteristics. Ordinarily the peroxides are sufficiently inactive and insoluble so that the essential consideration in the determination of the maximum permissible proportion is purely a physical matter, and such a peroxide is considered a part of the filler. The filler may consist of such a peroxide alone or in admixture with other non-fibrous mineral fillers (e. g., kaolin), if strength is not an essential requirement of the alkyd; but in most cases a fibrous filler is employed and a peroxide to fibrous material ratio of about 6:1 is the maximum proportion of the peroxide which may be used without detracting from the effect of the fibrous material.

In accordance with the present invention, a greatly improved polymerized alkyd resin is produced by carrying out a procedure which comprises the following steps:

(1) Esterification of a polyhydric alcohol with a polycarboxylic acid whose molecule contains at least one polymerizably reactive $\Delta^{2,3}$-enoyl group, to obtain a polymerizable unsaturated alkyd.

(2) Incorporation of a peroxide of zinc or cadmium in the polymerizable unsaturated alkyd, before substantial polymerization of such alkyd; and (3) Polymerization of the alkyd to produce a hardened resin (in the presence of the catalyst).

As hereinbefore described, the esterification of step (1) is carried out under such conditions that polymerization does not take place to any substantial extent. After the esterification is complete, the peroxide is incorporated in the alkyd and the reaction involving the fixing of the carboxy radicals in the alkyd takes place. In the present method, the esterification is completed before the incorporation of the peroxide since the presence of such peroxide would interfere with the esterification reaction. In fact, if the peroxide were added before the esterification is completed, all of the peroxide would immediately react to form metal salts with the carboxylic acids present which, in turn, would cause shorter alkyd chains to be produced, and the resulting product would consist of useless short chain alkyds and actually would contain no peroxide per se, but only zinc or cadmium salts.

Although it is important that the peroxide be added after esterification is complete, it is equally important that the esterification be such that a linear alkyd is produced. It has been found that, unless the alkyd is linear, the addition of the peroxide causes little or no neutralization of the alkyd, apparently because of steric hindrance. In other words, the cross-linked three-dimensional alkyd molecules are large and complex in structure and contain carboxy radicals throughout their structure. The structure of a linear alkyd apparently is sufficiently simple to be adapted for comparatively complete reaction with the peroxide; but the structure of non-linear alkyds is apparently so complex that most of the carboxy radicals are blocked off from the peroxide, and an appreciable amount of neutralization takes place only when quite elaborate and thorough methods of intimately incorporating the peroxide are used.

The peroxide, in the form of finely divided particles, may be incorporated in the polymerizable unsaturated alkyd by any of the known methods hereinbefore suggested for the incorporation of a filler in the alkyd. In the production of a molding composition or any other filler-containing alkyd composition embodying the invention, the peroxide may be incorporated when the filler is incorporated or before or after the filler is incorporated. Ordinarily it is preferable to form an intimate mixture of the filler and the peroxide (sometimes including a catalyst), and then to incorporate the mixture in the alkyd in the customary manner.

*Example 1*

A polymerizable unsaturated linear alkyd is prepared by the procedure hereinbefore described for a charge consisting of 1.05 mols of monoethylene glycol, 1 mol of maleic anhydride and an amount of hydroquinone equal to 0.04 per cent of the charge. The charge is heated to 220° C. (over a period of two hours) and is then held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (2.1 parts) and benzoyl peroxide (2.1 parts), as a catalyst. The composition so prepared, together with an amount of chrysotile asbestos equal to 23 per cent of the composition, an amount of kaolin (Georgia clay) equal to 40 per cent of the composition and, as a lubricant, an amount of zinc stearate equal to 2 per cent of the composition is then milled for 10–12 minutes on a heated two-roll (differential speed) rubber mill at the lowest temperature at which a homogeneous mass can be obtained (not more than about 75° C.). The resulting control composition is removed in sheets, is allowed to solidify fully while at about 80–90° F. and then is granulated in a high speed cutter to a maximum particle diameter of about 1/8 inch. The granulated composition is compression molded to produce articles of dimensions suitable for physical testing. The composition has excellent flowing properties, and is fast-curing and gives moldings free from gas.

The water resistance tests employed are standard tests for plastic materials and are considered to be capable of showing generally the water resistance characteristics that are important in industrial materials of this class. Water resistance varies with the amount of moisture that an article is capable of absorbing, because the degree of deterioration upon exposure to moisture varies with the amount of water absorbed.

The test piece, referred to hereinafter, for determination of water absorption is a seven gram two-inch diameter disk molded for one minute under a pressure of 17,000 pounds per square inch of projected area in a mold heated with steam at 75 pounds per square inch gauge pressure. The disk is immersed in hot or cold water for a given period of time, and the water absorption is measured as the gain in weight (in grams) during immersion. In the case of the foregoing control composition, it was found that a test piece immersed in boiling water for one hour absorbed 0.164 gram of water, and one immersed in cold water absorbed 0.153 gram of water in one day, 0.233 gram of water in two days, or 0.297 gram of water in seven days.

Additional test pieces are molded for standard "Barcol" hardness tests. The Barcol hardness of a molded material is read from a dial gauge of a standard Barcol hardness apparatus, which gives hardness readings as compared to an arbitrary standard. The initial Barcol hardness is 60 for articles molded from the control composition prepared as hereinbefore described, and the hardness is 27 after the test pieces are boiled in water for one hour.

The granular control composition is molded for one minute at 4500 pounds per square inch pressure in a mold heated with steam at 75 pounds per square inch gauge pressure to obtain 4-inch diameter disks 1/8 inch thick which are used for dielectric constant and power factor determinations. The dielectric constant is found to be 7.30 at 60 cycles and 5.15 at $10^6$ cycles. The power factor is 0.052 at 60 cycles and 0.038 at $10^6$ cycles.

A procedure is carried out that is the same as the foregoing procedure except that the filler used is as follows:

Kaolin, 35 per cent of the composition,
Asbestos, 23 per cent of the composition, and
Zinc oxide, 5 per cent of the composition.

Zinc oxide is one of the best substances that can be included in alkyd molding compositions to improve the water absorption and electrical characteristics of molded articles. A test piece molded from this composition absorbs only 0.146 gram of water when boiled in water for one hour, and when immersed in cold water absorbs .074 gram in one day, 0.110 gram in two days, and 0.194 gram in seven days. Moreover, the initial Barcol hardness of the test piece is 62, and after boiling in water for one hour, the hardness is 34. The dielectric constant is 7.23 at 60 cycles and 5.26 at $10^6$ cycles. The power factor is substantially the same as that of the control composition when 60 cycle current is used, but the power factor is 8 per cent lower when $10^6$ cycle current is used.

Another procedure is carried out which is the same as the foregoing except that a filler comprising a peroxide of the invention is included. This filler composition is as follows:

Kaolin, 35 per cent of the composition,
Asbestos, 23 per cent of the composition, and
Commercial zinc peroxide, 5 per cent of the composition.

The water absorption of a test piece after immersion in boiling water for one hour is 0.088 gram, and after immersion in cold water is 0.028 gram in one day, 0.052 gram in two days and 0.111 gram in seven days. This water absorption is much lower than the water absorption of the test pieces molded from the composition comprising zinc oxide. The Barcol hardness after immersion in water for one hour of the test pieces molded from the composition comprising zinc peroxide is found to be 59 per cent greater than that of test pieces molded from a composition without a peroxide. Moreover, the dielectric constant is found to be 6.47 at 60 cycles and 5.05 at $10^6$ cycles, and the power factor is found to be 0.045 at 60 cycles and 0.030 at $10^6$ cycles. It is observed that the presence of a peroxide of the invention in an alkyd molding composition causes substantial improvement in the water resistance and electrical properties of the molded articles. Moreover, the magnitude of the improvement is substantially greater than when zinc oxide is used alone as an end-group fixing agent in an alkyd molding composition. Similar results are obtained when an equivalent amount of cadmium peroxide is used instead of zinc peroxide in the preparation of molding compositions of the invention.

Having described the invention, I claim:

1. A hardenable composition comprising (1) a peroxide of an amphoteric metal of group II having an atomic weight between 65 and 115, (2) a polymerizable unsaturated alkyd, whose molecule contains a plurality of polymerizably reactive $\Delta^{2,3}$-enedioyl groups, and (3) a catalyst of the class consisting of organic peroxides and organic ozonides, said composition, after polymerization, being superior in its ability to retain its insulation resistance on long exposure to high temperatures and high humidities.

2. A hardenable composition as claimed in claim 1 that comprises a mineral filler in addition to the ingredients recited in claim 1.

3. A hardenable composition as claimed in claim 2 wherein the peroxide of an amphoteric metal is zinc peroxide.

4. A hardenable composition as claimed in claim 1 wherein the peroxide of an amphoteric metal is zinc peroxide.

DAVID E. CORDIER.

REFERENCES CITED

The following references are of record in the file of this patent:

UNITED STATES PATENTS

| Number | Name | Date |
|---|---|---|
| 2,388,319 | Fuller | Nov. 6, 1945 |